May 23, 1950 — T. W. ROBERTS — 2,509,169
ELECTRIC ROASTER
Filed May 23, 1947
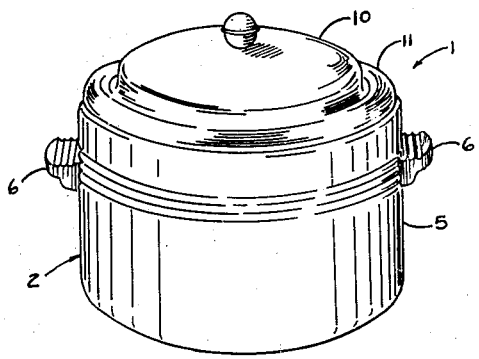
Fig. I
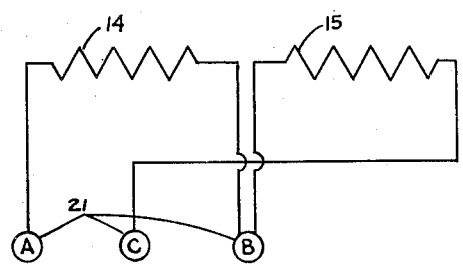
Fig. III
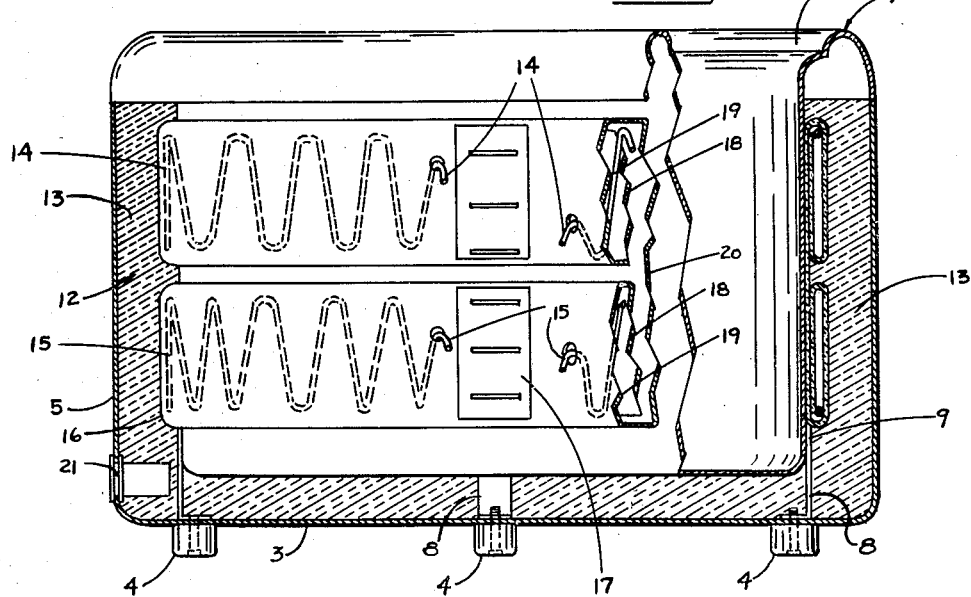
Fig. II
INVENTOR.
THERON W. ROBERTS
BY
Marshall and Marshall
ATTORNEYS Patented May 23, 1950

2,509,169

UNITED STATES PATENT OFFICE 2,509,169

ELECTRIC ROASTER

Theron W. Roberts, Toledo, Ohio, assignor to The Swartzbaugh Manufacturing Company, Toledo, Ohio, a corporation of Ohio Application May 23, 1947, Serial No. 749,899

1 Claim. (Cl. 219—35)

This invention relates to heating elements in electrical heating units, and particularly in small, portable electric cooking units or roasters.

Basically, an electric roaster consists of a housing enclosing a food container and a heating element. In small roasters the container is usually a deep-drawn steel pan coated with porcelain enamel. The heating element is simply a wire of sufficiently great resistance to give off the desired amount of heat when connected (through a switch) to the electric power source available in the home.

A small, portable roaster must meet certain essential requirements such as low cost, compactness, sturdiness, ease of assembly and repair, and simplicity of control of the power to the heating element. In order to obtain compactness it is usually necessary to mount the wires of the heating element circumjacent the walls of the pan, since the wires are usually of considerable length. In order to obtain sturdiness it is necessary to mount the wires firmly in position. Most cements and glues are not capable of withstanding the heat given off by the wires in ordinary operation or of firmly retaining the wires because of the stress and strain created by alternately heating and cooling. The difficulty of firmly mounting the wires on the walls of the container is further complicated by the fact that deep-drawn pieces must necessarily have a larger cross sectional area at the open end than at the bottom or closed end and therefore the walls of the container have a slight taper which causes the wires to have a tendency to slip off the walls. Other factors such as the ease of assembly and repair and the necessity of insulatingly mounting the wires also add to the difficulty. Even though it is desirable to have a considerable degree of control of the amount of heat given off by the heating element, such control must be furnished by means of an extremely simple device (or switch) to meet the requirement of low cost.

In the past a heating element in a roaster of the class described usually consisted of a plurality of heating wires wound helically around the walls of the pan. The wires were firmly and insulatingly cemented in place with a heat-resistant baking enamel. Although the resulting roaster was very compact and sturdy such a method of producing the roaster had many practical disadvantages. The baking process for the enamel was particularly clumsy and time-consuming and repairs and replacements of defective or broken wires, once cemented to the pan, were extremely difficult. Moreover the baked enamel was very rigid and cracked if the roaster was subjected to particularly rough treatment.

The principal object of this invention is the provision of an improved method of mounting the heating element in the heating unit of the class described.

A further object of this invention is the provision of a heating element which is mounted as a unit and which may be easily installed or removed in assembly and repair.

Another object of this invention is the provision of a mounting for the heating element which has a sufficient degree of resiliency to be capable of withstanding extreme shocks.

These and other objects and advantages will be apparent from the following description in which reference is had to the accompanying drawings illustrating a preferred embodiment of the invention, and wherein similar reference numerals designate similar parts throughout the several views.

In the drawings:

Figure I is a view in prospective of a roaster embodying the invention.

Figure II is a front elevational view of the roaster with parts shown in section and parts broken away.

Figure III is a schematic diagram of the electrical circuit in the heating element.

Referring to the drawings in detail.

A roaster 1 has a housing 2 which consists of a pan 3 on the bottom of which are attached legs 4 of heat insulating material and which has a substantially cylindrical-shaped wall 5 to which are attached handles 6 of heat insulating material. A pan-shaped food container 7 is mounted within the housing 2 by means of supports 8 which are bolted to the bottom of the housing 2 and welded to a cylindrical wall 9 of the container 7. A cover 10 rests in a lip 11 at the open and upper end of the container 7. A heating unit 12 is wrapped around the cylindrical wall 9 of the container 7 and the remainder of the space between the cylindrical wall 9 of the container 7 and the cylindrical wall 5 of the housing 2 is filled with a heat insulating material 13. The heating unit 12 is composed of heating elements, i. e., upper and lower high-resistance wave-shaped heating wires 14 and 15, which are separately wrapped in an electric-insulating material 16 (such as asbestos fabric). The material 16 is wrapped around the wall 9 of the container 7 and its ends are connected by clips 17.

The heating unit 12 is easily and quickly assembled simply by placing two heating wires 14 and 15 of the required length along opposite sides of a rectangular piece of the electric-insulating material 16 and then folding the material 16 toward its center and over each of the wires 14 and 15 twice so as to have the first fold 18 on the side of the wires 14 and 15 adjacent to the wall 9 of the container 7 and the second fold 19 on the side of the wires 14 and 15 away from the wall 9 and the remaining fabric 20 between the walls of the container 7 and the first fold 18 and connecting the heating wires so covered. The heating element 12 is tightly wrapped around outside of the wall 9 and the ends of the insulating material 16 are connected by the clips 17. The heating element 12 is held firmly in place against the wall 9 of the container 7 by means of the tight wrap, but it may also be desirable to cement or otherwise secure the fabric to the wall 9 of the container 7. The use of the substantially wave-shaped heating wires 14 and 15 is particularly advantageous in that wires so shaped may be easily insulated from each other, while at the same time, a sufficient length of wire is obtained in one turn around the wall 9 of the container 7 to give off the required amount of heat, i. e., the equivalent of numerous helical turns of a heating element each turn of which must be insulated from the others.

The ends of the wires 14 and 15 extend through holes in the insulating material 16 to a three pole male plug 21 (shown schematically in Figure III). The wires are connected in series so that the upper wire 14 extends from terminal A to terminal B and the lower wire 15 extends from terminal B to terminal C. By employing such a wiring system the roaster can be set at high heat or low heat merely by using a two socket plug in either of two alternate positions (i. e., "high" when the plug is connected to terminals C and B with one heating wire connected in the circuit and "low" when the plug is connected to terminals A and C with both heating wires connected in the circuit).

The embodiments of the invention may be modified to meet various requirements.

Having described the invention, I claim:

A heating unit for an electric cooker having a slightly frusto-conical pan comprising, in combination, a pair of sinusoidal heating elements wrapped around said pan in generally parallel relationship and a retaining and insulating sheet for holding said elements in place consisting of a single substantially rectangular sheet of insulating material having two wraps folded twice inwardly from opposite sides in a direction transverse to its length, each of the folded wraps enclosing one of said elements and the two wraps, when finished, lying parallel and vertically spaced on a common side of said sheet and joined by the web of said sheet originally lying along its center line, the folded sheet being located around the periphery of said pan with its ends connected.

THERON W. ROBERTS.

REFERENCES CITED

The following references are of record in the file of this patent:

UNITED STATES PATENTS

| Number | Name | Date |
|---|---|---|
| 1,946,220 | Lotz | Feb. 6, 1934 |
| 2,147,319 | Smith | Feb. 14, 1939 |
| 2,205,884 | Greenman | June 25, 1940 |
| 2,323,478 | Lobl | July 6, 1943 |
| 2,371,975 | Parsons | Mar. 20, 1945 |
| 2,401,360 | Lobl | June 4, 1946 |